Oct. 30, 1962  L. H. SMITH  3,061,070
FRUIT HANDLING MACHINE
Original Filed July 26, 1957  6 Sheets-Sheet 2
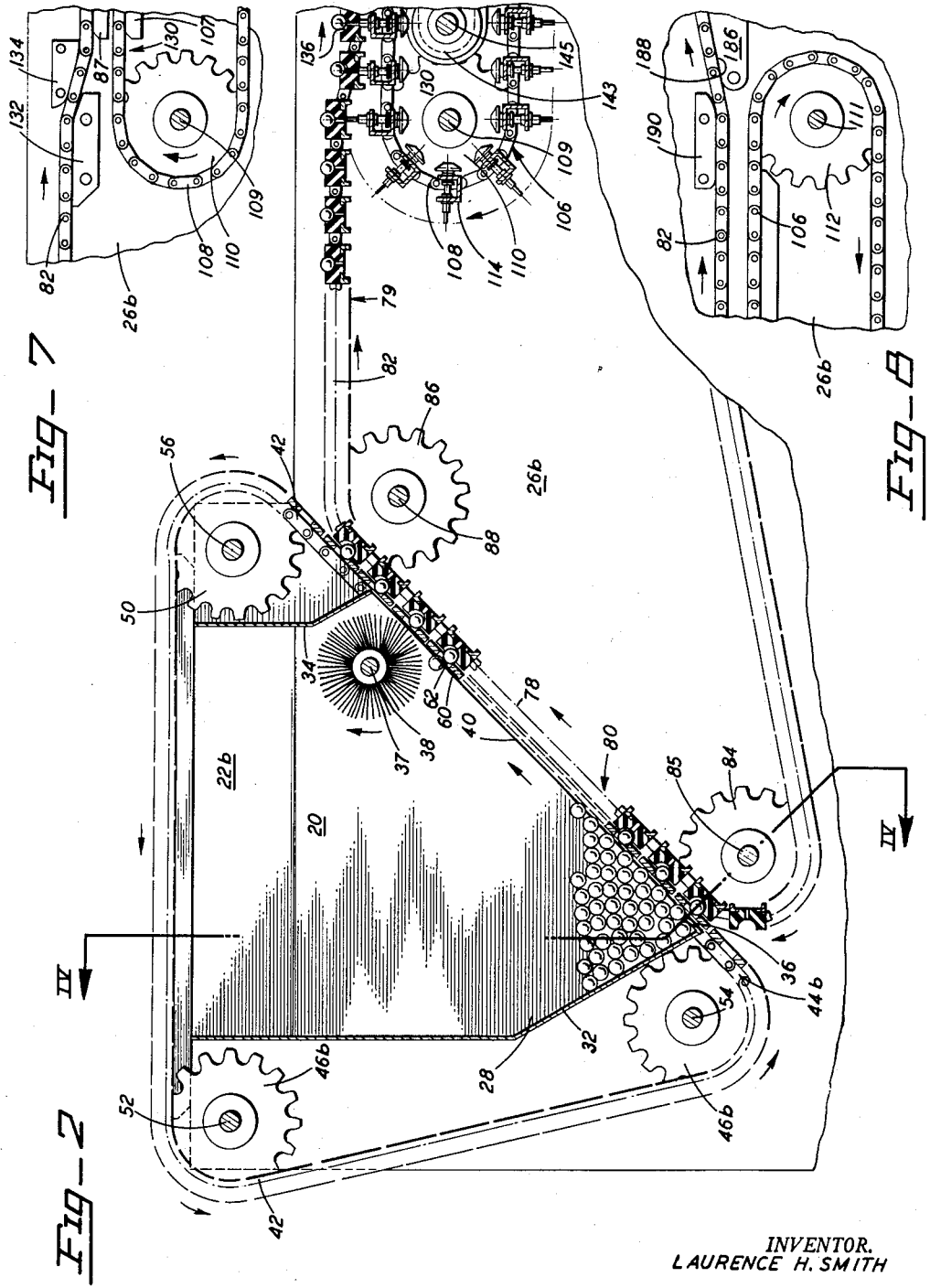
INVENTOR.
LAURENCE H. SMITH
BY
ATTORNEY Oct. 30, 1962 L. H. SMITH 3,061,070
FRUIT HANDLING MACHINE
Original Filed July 26, 1957 6 Sheets-Sheet 3
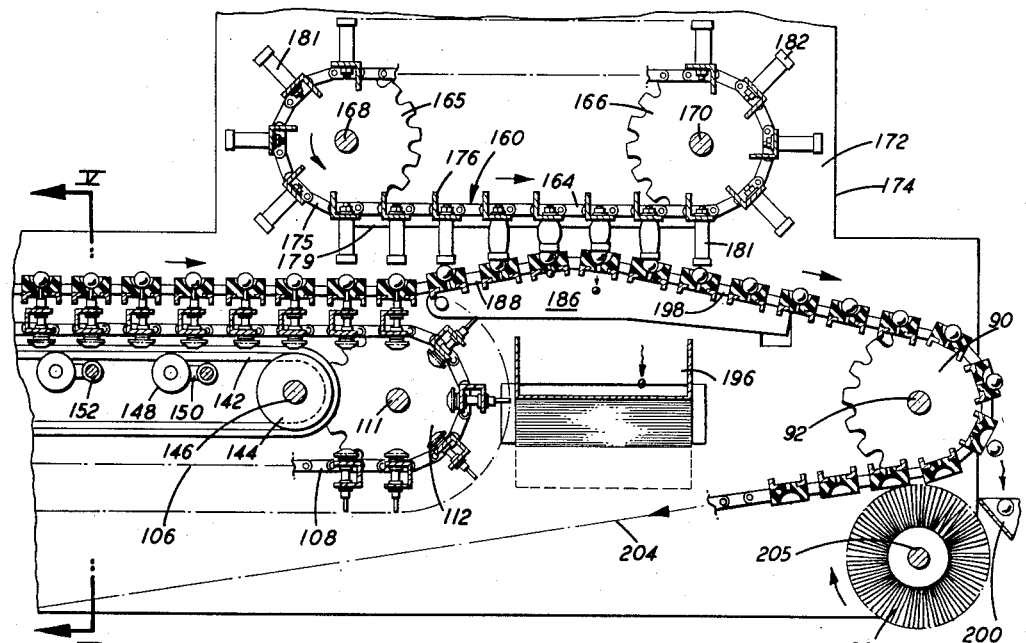
Fig_3
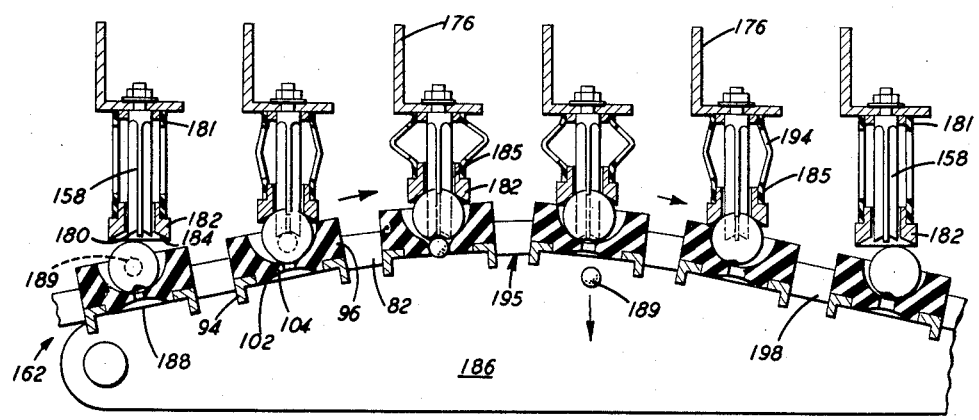
Fig_10
INVENTOR.
LAURENCE H. SMITH
BY
ATTORNEY

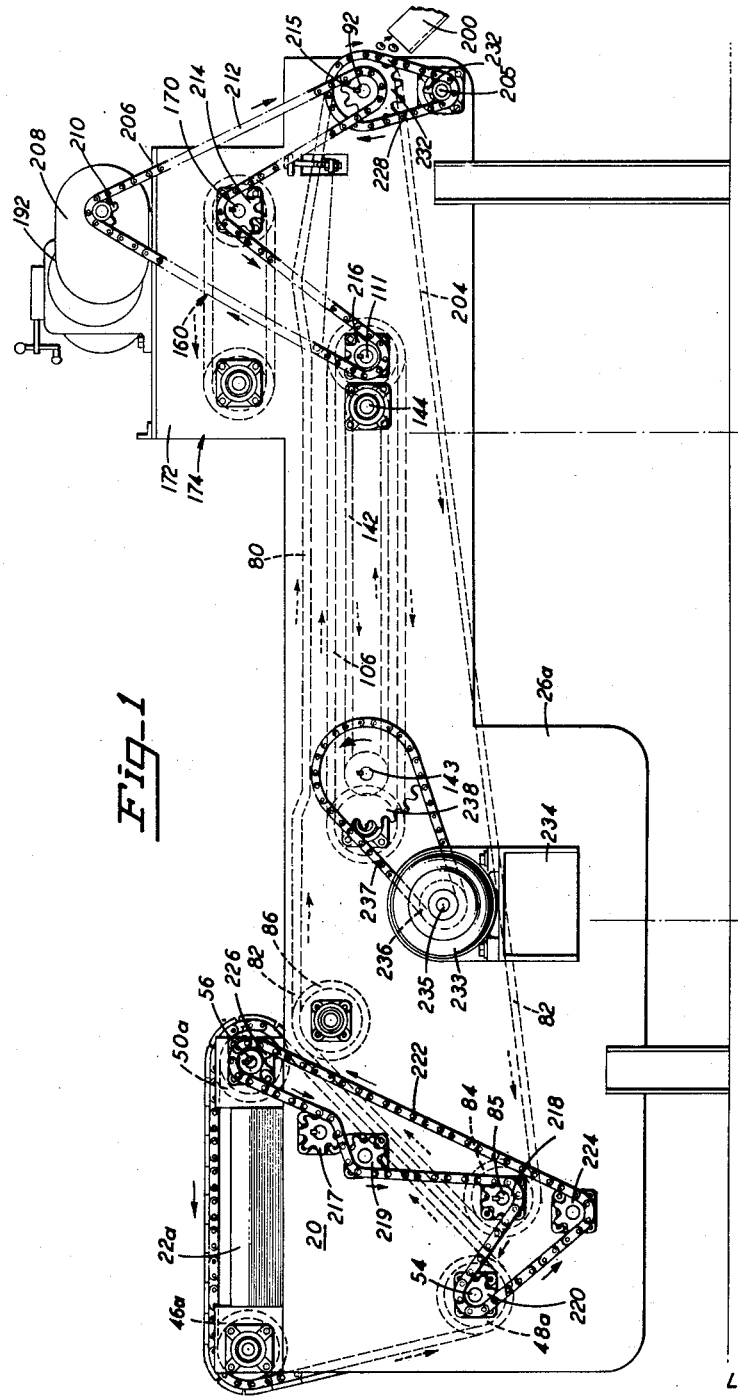

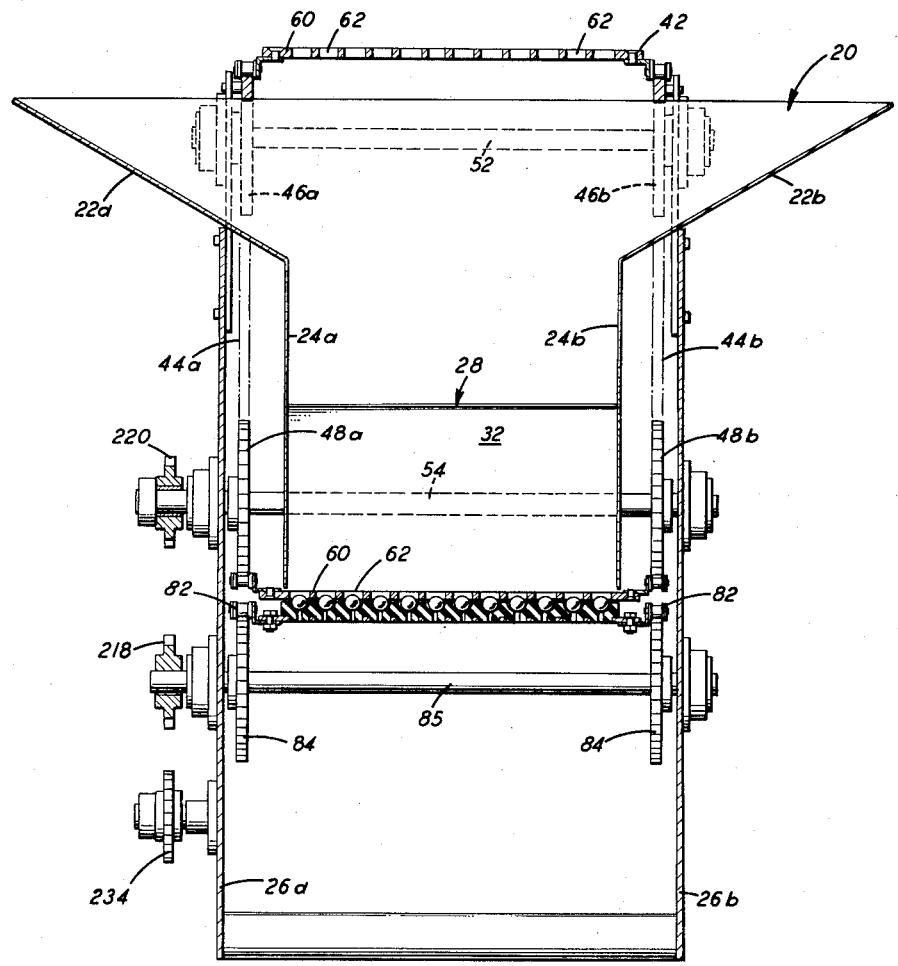
Fig_4

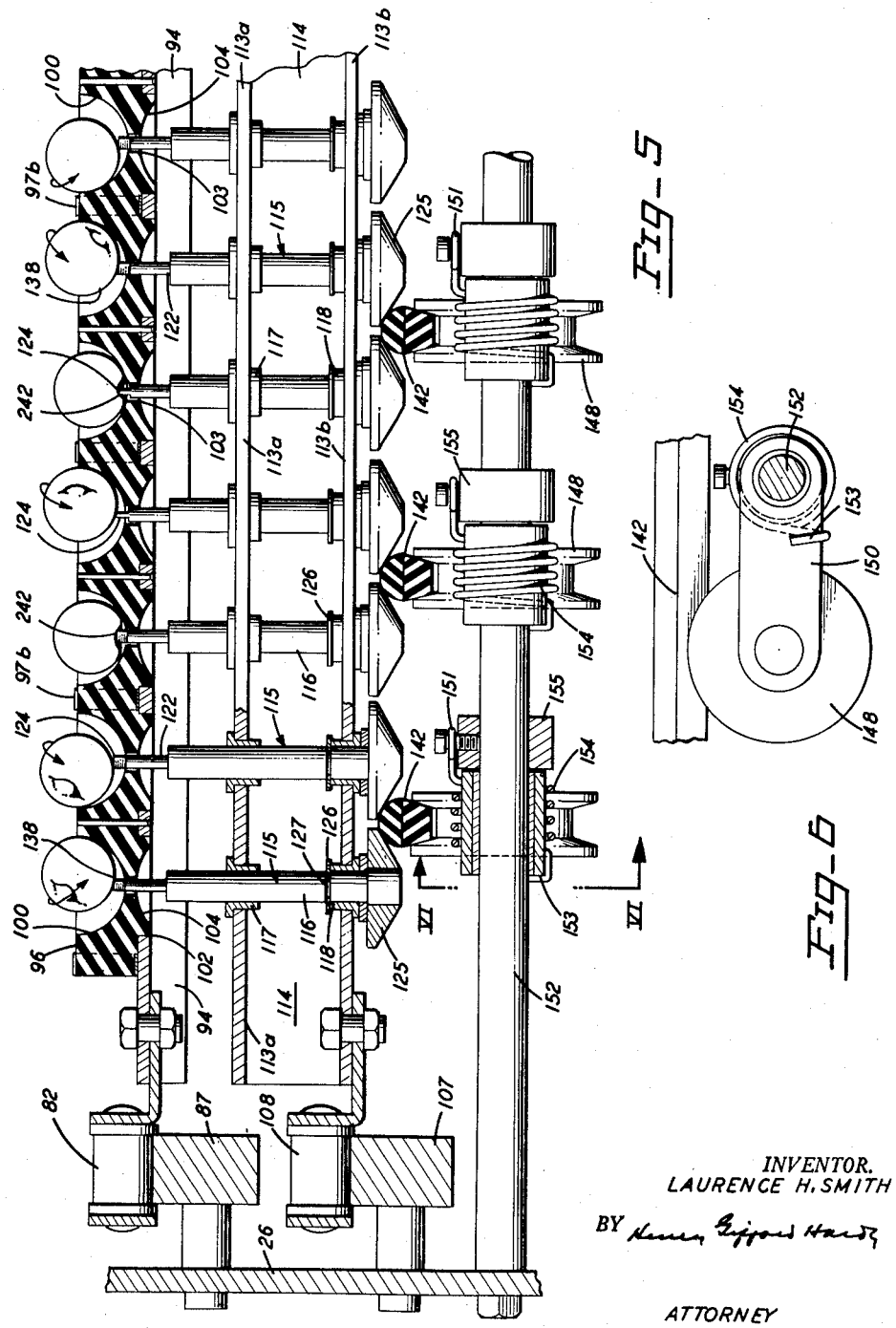

Oct. 30, 1962   L. H. SMITH   3,061,070
FRUIT HANDLING MACHINE
Original Filed July 26, 1957   6 Sheets-Sheet 6
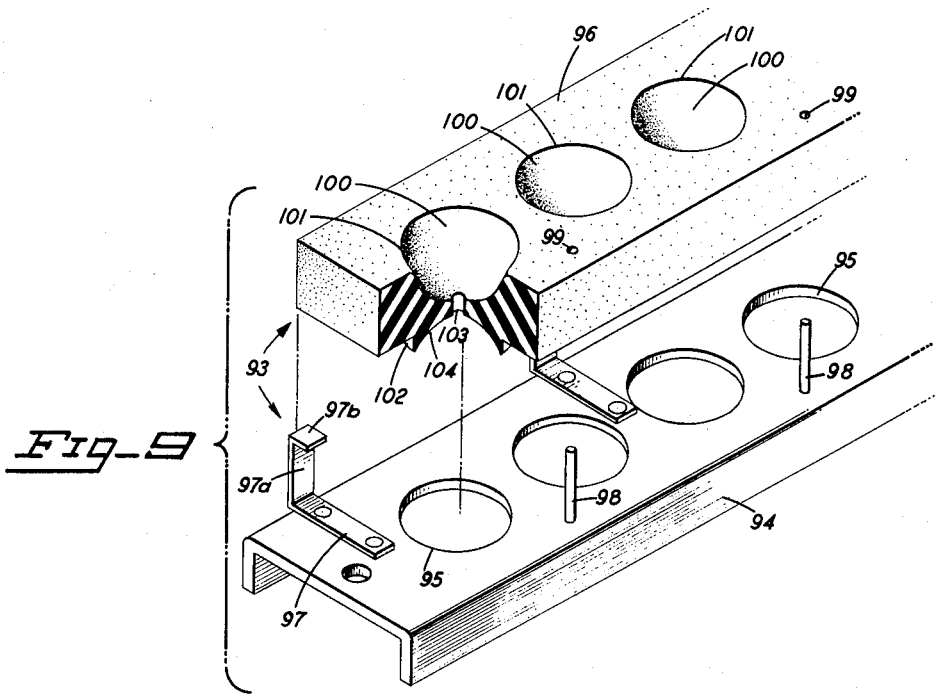
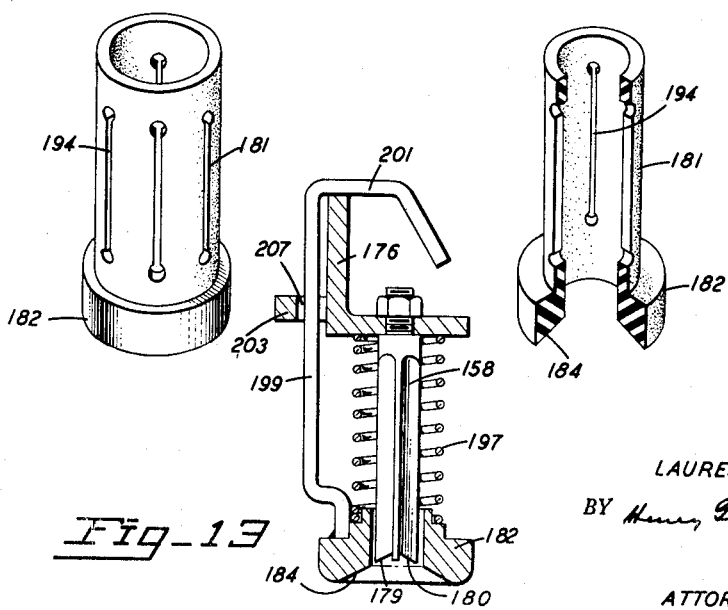
INVENTOR.
LAURENCE H. SMITH
BY *Henry Gifford Hardy*
ATTORNEY United States Patent Office 3,061,070
Patented Oct. 30, 1962

3,061,070
FRUIT HANDLING MACHINE
Laurence H. Smith, Walnut Creek, Calif., assignor to Atlas Pacific Engineering Company, a corporation of California
Original application July 26, 1957, Ser. No. 674,435. Divided and this application Nov. 27, 1959, Ser. No. 855,938
2 Claims. (Cl. 198—33)

The present invention relates to fruit handling machines and particularly to machines for orienting and pitting fruit which is of generally spherical conformation and has an indent or dimple at its slim end, such as cherries, peaches, plums, apricots, olives and the like.

Broadly, it is an object of the invention to provide an improved rapidly and dependably operating pitting machine for fruit of the type described.

Another object of the present invention is to provide fruit pitting equipment of the type referred to herein which is a synchronous, effective operating unit, yet at the same time eliminates complicated movements and parts which are costly and difficult to maintain in satisfactory operating condition.

Fruit pitting machines of the type here under discussion have heretofore been of the intermittent type, for the most part, i.e., comprising stationarily mounted pitting knives and movement of the cup-shaped containers containing the fruit to be pitted, successively into operative alignment with said knives, whereupon advance of the containers is temporarily arrested to permit the pitting knives to enter into operation upon the fruit in the aligned container to pit the fruit. After the pitting operation has been accomplished, advance of the containers is resumed until a successive fruit bearing container reaches a position in alignment with the pitting knives. Where the travel of the fruit containers is continuous, the pitting knives are required to move a short distance in order to accomplish the pitting operation which involves complicated cam or swinging movements with provision for return to the next adjacent containers.

It is a particular object of the invention to provide a continuously operating fruit pitting machine that is dependable and fast in operation.

Yet another object of the invention is to provide a continuously operating fruit pitting machine which makes a clean cut with a release of the pit with a minimum of flesh adhering thereto and with a minimum of damage to the fruit, and particularly to the outer surface thereof.

In order for the pitting to be commercially acceptable, it is necessary that the fruit be properly presented to the pitting knives, i.e., its blossom end should be presented to the pitting knife while its stem-blossom axis is in alignment with the axis of the pitting knife, so that the knife may punch the pit out through its dimpled stem end. It is a further object of the invention, therefore, to provide a simple, fast and dependably operating mechanism for orienting indented fruit of general spherical conformation in a predetermined manner.

Another object of the invention is to provide a mechanism for continuously and automatically placing dimpled, generally spherical fruit in a cup-shape container in such a position that its dimple faces downwardly.

More specifically, it is an object of the invention to provide a mechanism for orienting fruit of the type referred to in a cup-shape container in such a manner that its blossom end faces upwardly and the stem-blossom axis is vertically disposed with respect to said container.

In machines for pitting fruit, the fruit is presented to the pitting knives in an endless procession upon conveyors carrying an endless sequence of containers provided with cups, each cup intended to present a single specimen of the fruit to a pitting knife. While the fruit may be deposited into these cups in the proper position by hand, this is obviously a cumbersome and costly procedure and materially slows the production. Accordingly, it is another object of the present invention to provide a mechanism for mechanically loading individual specimens of the fruit into the cups of the successive containers of a continuous, endless conveyor of the type described.

More specifically, it is an object of the invention to provide a fast and dependably operating mechanism for delivering fruit dumped at random into a hopper, singly into the cups of successive containers of a fruit supply conveyor without causing injury to the fruit and without having more than one specimen of such fruit in each cup.

It is a further object to provide a pitting machine which will recover more fruit of maximum size and volume, with more pits per unit, due to the cleaner removal of the pits, having a minimum of adhering flesh.

Another object is the provision of a machine of the type described which has no reciprocating parts or motions as such, so that the speed of the machine is limited only by the rate at which the fruit can be loaded and properly positioned.

Further objects are to provide a construction of maximum simplicity, economy, and ease of manufacture, also such further objects, advantages and capabilities as will fully appear and as are inherently possessed by the device and the invention described herein.

Invention further resides in the combination, construction and arrangement of parts illustrated in the accompanying drawings, and while there is shown therein a preferred embodiment thereof, it is to be understood that the same is merely illustrative of the invention and that the invention is capable of modification and change, and comprehends other details of construction without departing from the spirit thereof or the scope of the appended claims.

Referring to the drawings:

FIGURE 1 is a side elevational view of a cherry orienting and pitting machine embodying the invention and schematically showing the drive and relative conveyor travel;

FIGURE 2 is a fragmentary, vertical, longitudinal section through the loading station of the machine illustrated in FIGURE 1 showing the manner of loading the successive containers;

FIGURE 3 is a fragmentary, vertical, longitudinal section through the pitting station of the machine illustrated in FIGURE 1;

FIGURE 4 is a transverse section through the loading station of the machine, taken along line IV—IV of FIGURE 2 and viewed in the direction of the arrows associated with said line;

FIGURE 5 is an enlarged cross section through the machine taken along the line V—V of FIGURE 3 and viewed in the direction of the arrows associated with said line;

FIGURE 6 is a side elevational, detail view showing one of the belt pressure components of the mechanism illustrated in FIGURE 5 as viewed in the direction of the arrows VI—VI indicated in FIGURE 5;

FIGURES 7 and 8 are fragmentary, elevational areas of the machine shown in FIGURE 1, illustrating details in the conveyor travel at the beginning and at the end, respectively, of the fruit orientation station thereof;

FIGURE 9 is a fragmentary, exploded perspective, partly in section, of one of the fruit carrier members of the supply conveyor which forms part of the machine illustrated in FIGURE 1;

FIGURE 10 is an enlarged fragmentary, vertical, longitudinal section through the pitting station of the machine illustrated in FIGURE 1;

FIGURE 11 is an enlarged perspective view of a fruit holding and stripping member forming part of the pitting mechanism illustrated in FIGURE 10;

FIGURE 12 is an enlarged perspective, shown partly in section, of a modified fruit holding and stripping member; and FIGURE 13 is an enlarged view of another form of fruit holding and stripping unit which may be used in place of those shown in FIGURES 11 and 12.

Referring now more particularly to the drawings, the machine of this invention comprises essentially three interrelated synchronized stations, a fruit loading station A (FIGURES 1, 2 and 4), a fruit orienting station B (FIGURES 1, 2, 3 and 5), and a pitting station C (FIGURES 1, 3 and 9).

The fruit loading station A is formed by a hopper 20 having converging side inlet chutes 22a and 22b (FIGURE 4) that are suitably supported from the side walls 24a and 24b of the hopper and spaced from the parallel longitudinal side walls 26a and 26b of the machine frame. Said hopper leads into a forwardly declined inner chute 28 (FIGURE 2) with its vertical side walls 24a and 24b and having a floor 32 which terminates at a substantially lower level than its opposed wall 34, as best shown in FIGURE 2. The bottom end 36 of chute 28 is closed off by the upwardly angled run 40 of an endless conveyor belt 42 which has a roughly triangular path as shown in FIGURE 2. The conveyor belt 42 is formed by a pair of transversely spaced, endless roller chains 44a and 44b trained around three pairs of sprockets 46, 48, and 50 (the a and b designations indicate the part adjacent the near and opposite sides, respectively, of the machine as viewed in FIGURE 1), which are mounted upon transverse shafts 42, 54 and 56, respectively, whose opposite ends are rotatably supported in the side walls 26a and 26b of the machine frame. Shaft 52 may be located behind the hopper 20, shaft 54 may be located below the floor 32 of chute 28 near the bottom end thereof and shaft 56 may be located forwardly of hopper 20, but in any event, in such a manner that the belt 42 formed with the sprocket chains 44 passes over and functions as a movable closure for the bottom opening of chute 28 at approximately a 45° angle, over the open top of the hopper 20 and returns behind the chute 28 to its bottom opening 36.

Supported transversely from and between and carried by the sprocket chains 42a and 42b is an endless sequence of adjacently positioned cross bars or hopper plates 60, each of which is a relatively thin flat plate provided with a row of uniform cylindrical apertures 62 of sufficient diameter to permit a single specimen of the fruit for which the machine is designed to freely pass therethrough. In the embodiment of the invention illustrated in the accompanying drawings the machine is designed for operations on cherries, and the following description will be with respect to cherries, but without limitation thereto. Hence, cherries dumped into the hopper 20 and sliding down the chute 28 will pile up against the conveyor belt 42 along run 40 and individual specimens will drop into and partially through the apertures 62 of each successive hopper plate 60 as it passes upwardly. As will be more apparent hereinafter, the apertures 62 of the hopper plates 60 are in substantial register along the upward run 40, with the conveyor chuck members, generally designated 93, which are provided with a row of uniform cups 100 for receiving and conveying a single cherry in each of said cups. As is shown in FIGURE 2, the thickness of the hopper plates 60 gives additional depth to the cups 100 when in substantial registry, so that the individual cherries from the supply in the hopper will automatically drop into the cups through the apertures 62 and be completely contained therein without any projection of the fruit being exposed. One cherry only can be so conveyed in each cup and aperture. It is possible, however, to have an additional cherry attempt to enter an occupied aperture and be carried thereby as shown in FIGURE 2, toward the upper portion of the run 40. But, as will be observed, there is not sufficient space for a second cherry to gain any foothold, and if it is not dislodged of its own accord in the upward travel and returned to the hopper supply, a counter rotating brush 37 is provided to accomplish the dislodgement. In this manner the feed of individual cherries to the conveyor 80 is accomplished positively and without damage to the fruit, which is easily mashed or bruised. So effective and accurate is this feed that even cherries with stems can be individually placed and conveyed.

As has been described, the upward run 40 of the hopper plate belt 42 is synchronous and in registry with the upper run 78 of the supply conveyor 80 upon which the fruit is oriented at station B and supplied in oriented position to and past the pitting station C of the machine.

The supply conveyor 80 comprises a pair of transversely spaced, endless roller chains 82 (FIGURES 1 to 5), which are located adjacent the inner face of the side walls 26a and 26b of the machine, that are trained over a pair of sprockets 84 which are located adjacent the sprockets 48 of the hopper plate conveyor 42 and which are mounted upon a transverse shaft 85 which is, in turn, mounted for rotation between the side walls of said machine. The roller chains 82 are also trained over a pair of sprockets 86 located forwardly of the hopper plate conveyor and mounted upon an idler shaft 88 which is rotatably supported in the side walls 26 of the machine frame, and thence over a third pair of sprockets 90 situated at the discharge end of the machine. Sprockets 90 are mounted upon a transverse shaft 92 which is likewise mounted for rotation in the machine frame 26. Supported from and between and carried by the sprocket chains 82 is an endless sequence of adjacently positioned chucks for receiving and transporting the fruit and which are generally designated 92. Each chuck has a rigid channel bar 94 provided with a row of circular apertures 95 (FIGURE 9). Strips 96 of a yieldable material, such as rubber having an optimum durometer of 28–32, are detachably held in position upon the outer flat surface of said channel bars by L-shaped spring clamps 97 which are secured to one edge of the channels 94 and by vertical pins 98 spaced along the opposite edge of said channel bars, alternately with respect to said clamps, and adapted to penetrate and be received in corresponding holes 99 in said yieldable strips 96. The yieldable shank 97a and the end hook 97b of the spring clamp 97 engage the side and top edge of said strips 96 to restrain the strips against displacement (FIGURE 9). Formed into the outer surface of each of said resilient strips in alignment with the apertures 95 of the supporting channel bar 94, are uniform hemispherical cups or depressions 100 of a size that will loosely receive a single specimen of the fruit for which the machine is designed. The edge 101 of the cup 100 is rounded so as not to present a sharp edge which might cut or bruise the fruit. To assure proper centering of the cups 100 with the apertures 95 in the supporting channel bar 94 and for trouble-free entrance of the positioners, circular shoulders 102 are formed upon the under surface of each strip in axial alignment with the corresponding cup. The perimeter of the shoulder 102 fits easily into the aperture 95. From the perimeter of the shoulder 102 to the center the form is arcuate to provide a concave dome 104. A small through opening 103 is provided in the bottom center of each cup.

The cups 100 of the successive resilient strips 96 are spaced from each other in a direction longitudinally of the advance of conveyor 80, by substantially the same distance as are the cylindrical apertures 62 in the successive hopper plates 60 of the loading conveyor 42. The advance of both conveyors is accurately timed and synchronized in such a manner hat whenever a hopper plate 60 of the loading conveyor moves upwardly beyond the edge 36 of the chute 28, its apertures 62 will be in substantial alignment with the cups 100 of the chucks 93. Hence, cherries are supplied, one to each cup as before described, and the loaded conveyor 80 is carried up over sprocket 86 to substantially level travel.

As the fruit is carried along the substantially level run 79 of the conveyor 80, means enter into the continuous operation which cause the cherries in said cups to be oriented with their indented or dimpled ends face downwardly. This is accomplished in the travel through the orientation station B. These means comprise an endless conveyor belt 106 that is disposed concentrically within the conveyor 80 and which is formed by a pair of transversely spaced roller chains 108. Said chains are trained around pairs of sprockets 110 and 112, which, in turn, are mounted upon transverse shafts 109 and 111, respectively, that are rotatably held in the side walls 26 of the machine frame. Supported from and between the chains 108 and carried thereby is an endless sequence of adjacently positioned channels 114 of C-shaped cross section corresponding in vertical alignment to the chucks 93 of the supply conveyor 82. Mounted for rotation in the flanges 113a and 113b of said channels is a row of indent finder or positioner elements 115 of precisely the same number as there are cups in the chucks 93 carried by conveyor 80. With particular reference to FIGURE 5, each positioner 115 comprises a stem portion 116 that is carried up over sprocket 86 to substantially level travel.

As the fruit is carried along the substantially level run 79 of the conveyor 80, means enter into the continuous operation which cause the cherries in said cups to be oriented with their indented or dimpled ends face downwardly. This is accomplished in the travel through the orientation station B. These means comprise an endless conveyor belt 106 that is disposed concentrically within the conveyor 80 and which is formed by a pair of transversely spaced roller chains 108. Said chains are trained around pairs of sprockets 110 and 112, which, in turn, are mounted upon transverse shafts 109 and 111, respectively, that are rotatably held in the side walls 26 of the machine frame. Supported from and between the chains 108 and carried thereby is an endless sequence of adjacently positioned channels 114 of C-shaped cross section corresponding in vertical alignment to the chucks 93 of the supply conveyor 82. Mounted for rotation in the flanges 113a and 113b of said channels is a row of indent finder or positioner elements 115 of precisely the same number as there are cups in the chucks 93 carried by conveyor 80. With particular reference to FIGURE 5, each positioner 115 comprises a stem portion 116 that is rotatably received and passes through bushings 117 and 118 provided in the flange portions 113a and 113b, respectively, of its supporting C-shaped channel bar 114. The outwardly projecting end of each stem 116 forms a slender rod-shaped tenon 122 which terminates in a rectangular shaped edge 124 similar to the edge of a conventional screw driver. The inwardly projecting end of each stem 116 is provided with a head 125 of shallow trunco-conical conformation. Each of the stems 116 is held in position within its supporting bar 114 by a suitable retaining member in the form of an annular disc 126 that engages an annular groove 127 provided in the stem and which bears against the inner edge of the bearing 118. The conveyor 106 which carries the positioners 115 is moved in synchronism with the supply conveyor 80 so that along the upper substantially horizontal run 79 of the latter, a channel 114 of the conveyor 106 will always align itself and travel in congruence with a chuck 93 of the supply conveyor 80. The positioner, in order to accomplish its function, must have its tip penetrate the opening 103 in the center of the cup and physically displace to a small degree the fruit within the cup.

To cause the positioner elements to enter the fruit supporting cups 100 of the supply conveyor 80, the upper run 79 of the latter is caused to descend to a level of closer proximity to the upper horizontal run 130 of the conveyor 106, which may be accomplished by opposed guide shoes 132 and 134 that engage the opposite upper and lower edges of the conveyor chains 108, as shown in detail in FIGURE 7. As the chucks 93 of conveyor 80 descend to the level determined by the guide shoes 132 and 134, each of the slender tenons 122 of the positioners 115 supported from a synchronously advancing channel member 114, enter a corresponding aperture 103 in the chuck 93 and penetrate the cup 100 so that the tip 124 engages and lifts the cherry situated therein slightly above the floor of the cup as shown at 136 in FIGURE 2 and at 138 in FIGURE 5. The hereinbefore described shallow, dome-shaped depressions, best shown in FIGURES 5 and 9, facilitate entrance of the tenons 122 of the positioners into the perforations 103 of the cups with which they are to cooperate. Once a positioner 122 has penetrated a cup from below and lifted a cherry situated therein above the bottom thereof, means enter into operation that spin the positioners about their center axis and cause the cherries leaning against the rectangular shaped edges 124 of the positioners to move and turn. This means for rotating the positioners includes a series of parallel endless belts 142 (FIGURE 5) disposed concentrically within the conveyor 106 and which are trained about pulleys 143 and 144, respectively (FIGURES 2 and 3), that are mounted upon transverse shafts 145 and 146 which are rotatably supported in the side walls 26 of the machine frame. The upper run of each of said belts is arranged to frictionally engage the conical heads 125 of two adjacently positioned positioners 115, as is best shown in FIGURE 5, and by traveling in a direction counter to that of the conveyor 106, the belts 142 impart rapid rotation to the finder elements advancing on conveyor 106. To insure effective operative engagement of the belts 142 with the heads 125 of the positioners over the total length of their upper horizontal runs, means are provided at intervals along said runs that yieldably press the belts 142 against the groove formed by the adjacent heads 125 of the positioners. Referring to FIGURES 5 and 6, the yielding pressure means is provided by free running pulleys 148 which are rotatably mounted upon short arms 150 which, in turn, are rotatably supported upon cross rods 152 secured at suitable intervals in the side walls of the machine frame (FIGURE 3). The arms 150 are urged upwardly, i.e., in clockwise direction as viewed in FIGURE 6, by coil springs 154 that surround the cross rods 152 and which have one of their ends 151 anchored in bushings 155 secured to said rods, while their other ends 153 bear against the lower edge of the arms 150. In this manner they urge the grooved edges 156 of the pulleys from below against the upper runs of the belts 142 and insure effective driving engagement of said belts with the conical heads 125 of the positioners 115 so that so long as the engagement lasts the rotation of the positioners will be continuous and substantially uniform.

The roller chains 82 and 180 are supported by and travel along stationary guides 87 and 107, respectively, secured to the side walls 26 of the machine in order to maintain level travel and maintain the appropriate relationship. (See FIGURES 5 and 7.)

In practice it has been found that the described orienting mechanism, when allowed to operate over a distance of 36" with the positioners rotating at a speed of 1100 r.p.m., will cause 90% plus of the cherries to assume the desired position wherein their stem-blossom axes are vertically disposed and their dimples or indents are positioned downwardly. It is to be understood that all of this is accomplished during the course of the continuous travel of the conveyor 80 and without any change of speed.

After the cherries have been properly oriented in their respective cups 100, in the manner described hereinbefore, so that their stem-blossom axes are vertically disposed and their indents face downwardly, they are in the proper position to be presented to the pitting mechanism, which constitutes station C. For this purpose a continuous sequence of pitting knives 158 is suspended from an endless conveyor belt 160 that is arranged above the terminal portion of the upper runs of supply conveyor 80. The terminal portion of the supply conveyor 80 is arranged to form a gently rising elevation 162 that approaches the lower horizontal run 164 of the pitting knife conveyor 160 to such an extent that the positioned cherries carried in the cups 100 of the supply conveyor 80 are briefly, but continuously, brought into operative engagement with aligned pitting knives 158 which travel in the same direction and at the same speed. With specific reference to FIGURES 3 and 10, pairs of sprockets 165 and 166 are mounted upon transverse shafts 168 and 170, respectively, that are rotatably supported in the opposite side walls 172 of a superstructure 174 of the machine frame, and trained around said sprockets is a pair of endless sprocket chains 175. Supported from and between said chains is an endless sequence of adjacently positioned channels 176 of L-shaped section. A row of the pitting knives 158 is rigidly supported from the horizontal leg of said channels in positions corresponding to and in axial alignment with the cups of the chucks 93. Said knives may be of conventional design, having five to six slender blades 178 arranged radially about their vertical axis and the end edges 179 of said blades are cut back inwardly to form pockets 180 adapted to receive and grip the pit 189 of a cherry. Each of the knives 158 is concentrically surrounded by a sleeve 181 of a resiliently yieldable material, such as rubber, which is likewise supported from the horizontal leg of the L-shaped channels 176 (see FIGURE 10). Each of the resilient members carries at its free end at the level of the front edge of its pitting knife an annular stripper member 182 that surrounds the free edge of the pitting knife and which has a concave inner surface 184 that is adapted to overlie the outer surface of the fruit for which the machine of the invention is designed. In the embodiment of the invention illustrated in FIGURES 10 and 11, said stripper element is a separate component of metal or the like, that has a neck 185 which is received in and is secured to the free end of the resilient sleeve 181, but both the sleeve and the stripper member 182 may be an integral structure as shown in FIGURE 12.

To elevate the travel of the cherries in the cups 100 into operative contact with the pitting knives, guide shoes 186 of shallow, generally triangular contour are arranged below the chains 82 of the supply conveyor 80. The elevating guide shoes 186 are secured to the side walls 26 of the machine and are located so that their ascending edges 188 serve the added purpose of disengaging the positioners 115 from the cups of the feed conveyor after orientation of the cherries in said cups has been accomplished. To retain the chains 82 of the feed conveyor in horizontal position for the full length of its cooperation with the conveyor 106 that carries the positioners, guide shoes 190 are arranged above, and engage, the upper edge of the roller chains at a point above the sprockets 112 of the positioner carrying conveyor 106 (see FIGURE 8).

The pitting knife conveyor 160 is driven in precise synchronism with the feed conveyor such that along its lower horizontal run a transverse row of pitting knives 158 will always align itself and advance in congruence with a row of cups 100, and for this purpose the pitting knife conveyor is driven from the same motor 192 which drives the feed conveyor 80 and the finder rod conveyor 106 (FIGURE 1).

Whenever a chuck 93, with its row of cups 100 containing properly oriented cherries, moves underneath the pitting knife conveyor, the shoes 186 are effective to lift the chuck and cherries gradually toward a row of pitting knives that advance in congruence with said cups until the blossom ends of the oriented cherries contained in the cups engage the strippers 182 that surround the end edges of said knives. The strippers 182 momentarily hold the cherries in the cup before contact with the pitting knives so that the cherry is presented firmly. As the chucks continue to climb the shallow slope established by the guide shoes 186, the cherries are pushed positively against the strippers 182 which cause their tubular resilient supports 181 to yield upwardly, while the immovable knives 158 simultaneously penetrate into the blossom ends of the cherries as shown in FIGURE 10. To allow the tubular resilient supports or sleeves 181 to yield more readily, their cylindrical side walls may be provided with vertical slots 194 as shown in both FIGURES 11 and 12. As the immovable pitting knives continue to enter the cherries, they engage the stones 189 with their recessed cutting edges 180 and move them downwardly within the continuously rising cherries. Finally as the cups reach the crest 195 of the slope established by the guide shoes 186, the knives punch the stones 189 out of the cherries at the stem ends thereof and push them through the center apertures 103 of the cups in the rubber strips 96 and through the openings 95 in the supporting channels 94, causing the pits to drop with a free fall into a suitable removable receptacle 196 which is supported from the side walls of the machine frame, at a point below the crest 195 of the conveyor belt 80, as shown in FIGURE 3. Then, upon further advance of the conveyor 80, as the cups descend the declined slope 198 of the elevation established by the guide shoes 186, the positive force previously applied to the cherries by the yieldable support members 181 is gradually released as the pitting knives are withdrawn. This causes said resilient support members to return to their original position which exerts sufficient downward force upon the cherries impaled upon the pitting knives through the buffer members 182 to strip the pitted cherries from said knives and deposit them loosely into their cups. Then, as the rows of cups 100 swing downwardly over the sprockets 90 at the discharge end of the machine, the pitted cherries drop into a suitable chute 200 which is arranged at a level below said sprocket from whence the cherries are carried for further processing.

Another form of resilient stripper is shown in FIGURE 13. As before described, the pitting knife 158 is secured to the horizontal leg of the transverse L-shaped bars 176. A compression spring 197 surrounding the pitting knife, replaces the purpose and function of the rubber or resilient member 181 and is secured to the domed stripper member 182 precisely as before set forth. To limit the downward travel of the spring 197, a limit hook 199 is provided. This hook is secured at one end to the stripper member 182 in any suitable manner and extends upwardly behind the vertical leg of the L-shaped transverse member 176 and back over the vertical leg thereof. The backward bend which forms the hook 201 thereof bears against the marginal edge of the vertical leg to limit the outward or downward movement of the spring. A suitable bar member 203 is secured to the back of the vertical leg of member 176, having suitable perforations 207 therethrough which act as guides for the hook members 199.

In order to maintain and insure precise travel and correct relationship of the moving members the roller chain 175 of the pitter conveyor guides and travels on guide rails 177 secured to the side walls 172 of the superstructure 174.

To clean the cups from any fruit or fragments that may have remained therein as a result of the pitting operation, a rotary brush 202 may be arranged to act upon said cups as they return in inverted position along the lower run 204 of conveyor 80 to the feed end thereof. Said brush may be mounted upon a transverse shaft 205 that is rotatably supported in the side walls of the machine frame and which is kept in a state of rapid rotation as long as the machine is in operation, by rotary power derived from the shaft of the terminal sprockets 90 of the conveyor 80.

It remains to describe how the various movable components of the machine may be driven at their proper speeds from a single motor 192 which has been mentioned hereinbefore and which is mounted upon the roof 206 of the superstructure 174 (FIGURE 1). Said motor delivers its output to a suitable speed reducer 208 whose output shaft carries a small sprocket 210. An endless roller chain 212 is arranged to drive simultaneously the pitting knife conveyor 160, the feed conveyor 80 and the positioner conveyor 106, at equal speeds and in the proper direction. For this purpose the shaft 170 of the pitting knife conveyor, the shaft 92 of the feed conveyor, and the shaft 111 of the positioner conveyor each carry sprockets of equal size, identified in FIGURE 1 by the reference numerals 214, 215, and 216, respectively, and the sprocket chain 212 is trained around said sprockets in such a manner that its inner edge engages the sprockets 215 and 216, while the sprocket 214 is engaged by its outer edge. To drive the fruit loading conveyor 42 in synchronism with, but in the opposite direction to the feed conveyor 80, the shaft 85 at the front end of the feed conveyor carries a sprocket 218 and the shaft 54 of the loading conveyor carries sprocket 220 which is of equal size. A roller chain 222 is trained around sprocket 218 to idler sprocket 220 on shaft 54, to idler sprocket 224 rotatably supported from the machine frame to sprocket 226 mounted on the outer end of shaft 56, to sprocket 217, to idler sprocket 219, and thence to sprocket 218. The roller chain 222 engages the said sprockets in such a manner that its outer edge engages the sprocket 218 on feed conveyor shaft 85 and the sprocket 217 while sprocket 220 on shaft 54, idler 224, sprocket 226 of the drive shaft 56 of the hopper plate conveyor 42, and idler 219 are engaged by the outer edge of the chain. It will be seen that with the drive of sprocket 217 the brush 37 is rotated on its shaft 38 in the opposite direction to the travel of the conveyor 42.

The rotary brush 202 which engages and cleans the return run of the feed conveyor 80 near its discharge end may be driven by a roller chain 228 that is trained about a sprocket 230 of relatively small diameter which is mounted on the shaft 205 of the brush and the sprocket 232 of relatively large diameter which is mounted upon the drive shaft 92 of the feed conveyor.

In the embodiment of the invention illustrated in the accompanying drawings, only the belts 142 which effect rotation of the positioner elements 115, are driven from a separate source of power, namely the motor 233 which is mounted upon a bracket 234 that is bolted to the side wall 26a of the machine frame. The output shaft 235 of said motor carries a sprocket 236 of relatively small diameter which is operatively connected by means of roller chain 237 with a sprocket 238 of relatively large diameter that is mounted upon the outwardly projecting end of the shaft 145 that carries the hereinbefore described drive pulleys 143 for the belts 142. As before indicated, rotation and movement of the pulleys and belts is counter-directional to that of the conveyor 80. Obviously, the motor 233 may be mounted for direct drive to the pulley 143.

Operation

While the operation of the cherry-loading, orienting, and pitting mechanisms of the machine of the invention have been described concurrently with the description of the structure thereof, it may aid in an understanding of the invention to briefly recapitulate various functions and operations of these components.

When the machine, described hereinbefore and illustrated in the accompanying drawings, is to be used in practice, both the motors 192 and 223 are set into operation. Cherries from which the stems have been removed may now be dumped into the hopper 20 from where they slide down the floor of chute 28 onto the rising run 40 of the hopper plate 42 and drop singly through the apertures 62 of the plates 60 and into the cups 100 of the chucks 93 in registry therewith. The plates 60 add depth to the cups and both prevent more than one piece of fruit from entering the cup and maintain the single specimen therein. As the conveyor bars 60 and chucks 93 with their apertures and cups individually filled with cherries move upwardly away from the bottom opening 36 of the chute 28 and pass upwardly at about a 45° angle, any fruit which may rest on top of a filled cup and which has not fallen back into the supply by itself, will be removed and returned to the supply by the counter rotating brush 37. In this manner, the filling of each cup, and with a single specimen only, is assured. Thus, the filling of the supply conveyor belt is continuously and automatically effected in station A.

The cherries in the cups of the supply conveyor 80 are in random position and before they may be subjected to the pitting mechanism, they must be aligned in such a manner that their stem-blossom axes are disposed vertically with the stem indent or dimple facing downwardly. Only when they are disposed in this manner can the injury caused to the surface of the cherry during the pitting operation be kept to a minimum. Therefore, to accomplish this result during the transit of station B, as the feed conveyor 80 carries the cherries along an initial portion of its upper run, the horizontal path of travel is lowered and positioners 122 enter the cups from below through the apertures 103 and lift the cherries slightly from the bottom of the cups so that for a fraction of a moment when they are dislodged they tilt sidewards and lean against the side wall of their respective cups, as shown in FIGURES 2 and 5. At this point in the sequence of operation, the conical heads 125 of the positioner 115 encounter the rapidly counterrunning belts 142 which impart rotary movement to each of the positioners in the course of its travel. Rotation of the screwdriver-shaped top edges 124 of the positioners which engage the cherries is effective to turn and move the cherries in their respective cups in an irregular pattern about constantly varying diametrical axis of rotation, causing the stem indents of the cherries of pass sooner or later over the top edges of the positioners. When this occurs the cherries settle deeper over the top ends of the finder elements and align their stem-blossom axes with axes of the positioners, as shown at 242 in FIGURE 5, and from then on turn with the positioners about their stem-blossom axes, while their stem indents remain in a downwardly facing position. As the positioners advance beyond reach of the rotation imparting belts 142, they come to rest and as the chucks 93 ascend the upwardly sloping side 188 of the elevation established by the shoes 186, the positioners are removed from the cups and the cherries contained therein remain in properly oriented position, i.e., with their stem-blossom axes disposed vertically and their stem indents or dimples facing downwardly. They are delivered continuously in this manner to station C.

As the chucks 93 continue to ascend the upwardly sloping side of the elevation in the upper run of the feed conveyor 80, the positioned cherries are lifted into contact with the resiliently mounted concave stripper elements 182 that surround each of a bank of congruently advancing, downwardly directed pitting knives 158. Then, as the chucks are raised still further, they push the cherries positively against the said stripper elements, causing their tubular supports 181 or springs 197 to yield upwardly as shown in FIGURES 10 and 13, while the unyielding pitting knives enter the cherries at their blossom ends, engage the pits 189 in their interior with their recesssed ends 130 and punch them through their stem ends and through the center apertures 103 in the cups 100 and the openings 95 in the supporting channel bars 94, permitting them to drop in a free fall into a suitable receptacle 196 below the upper conveyor run. Then, upon further advance of the conveyor 80, as the chucks with pitted cherries travel down the descending slope of the elevation established by the guide shoes 186, the positive pressure is gradually withdrawn from the stripper 182, and their resilient supports 181 and/or 197 permitting them to expand and strip the pitted cherries from the pitting knives 158 upon which they are impaled, so that the cherries remain at all times in the cups 100. At the discharge end of conveyor 80 the pitted cherries drop from the cups 100 into the chute 200.

With further reference to FIGURE 10, it will be observed that the positioned cherries, as they start up the incline and pass to the crest 195, have their axes at a slight angularity with respect to the corresponding strippers and knives. Thus, when the cherries engage the concave portion 184 of the strippers 182, the cherries are gripped and held in this slightly angled position and together with the forward movement of the belt 80, are rocked slightly into the cutting edges of the pitting knives. Thus, there is no sudden mashing or pushing of the entire knive through the skin all at once. The same kind of action occurs in reverse on the down path 198. It is believed that this action results in the pitting of the cherries with a minimum amount of adhering flesh, and produces the superior product not heretofore attained.

All of the stations A, B and C operate continuously and at the same speed so there are no dwells, hesitations, or delays of any kind involved in the operation, which would require complicated mechanism for building and maintenance.

The described machine loads cherries singly into the pitting cups 100 of the feed conveyor 80. It is effective to properly orient a very high percentage of the cherries in said cups for the subsequent pitting operation, it removes the pits from the oriented cherries without any interruption in the continuous advance of the supply conveyor and without marring the surface of the cherries beyond the clean incision at their blossom ends effected by entrance of the pitting blades. Due to the fact that the machine of the invention is constructed to operate continuously, i.e., without interruption in the advance of the cherry supporting cups, such as is necessary in cherry pitting machines of the intermittent type, it may be operated at great speeds without reduction in its efficiency and without undue noise.

It will be observed that station C functions to pit cherries and the like without the orientation operation of station B. Pie cherries, for example, are pitted without regard to orientation. The machine is and can be operated at much greater speed where orientation of the fruit is not required.

While this invention has been described with the aid of a particular embodiment thereof and with reference to cherries, it will be understood that the invention is not limited to the constructional details shown and described, and that the same is not restricted to cherries.

This is a divisional application of my copending application Serial No. 674,435 filed July 26, 1957, now abandoned.

I claim:

1. An arrangement for continuously orienting generally spherical fruit having a stem indent, such as cherries, plums and the like, comprising a first conveyor carrying a sequence of adjacent chucks each having a row of cups adapted to loosely contain a single specimen of the fruit, with each cup having a central aperture through its bottom, a substantially horizontal run for said first conveyor, a second conveyor carrying a sequence of vertically disposed rotatably but fixedly mounted positioners arranged transversely in rows to correspond with the vertical axis of each cup each having a slender tenon with a screwdriver-shaped upper end, a horizontal run of said second conveyor in parallel relation to but below said first conveyor, means for operating said conveyors continuously in synchronism so that the cups and positioners thereof advance continuously at all times in vertical alignment, means at the beginning of said horizontal run of said first conveyor to cause it to descend to a predetermined lower horizontal run so as to effect during the angular descent individual penetration of the tenon ends of each positioner through said central apertures of each cup to lift fruit situated therein slightly above said bottoms; means associated with said second conveyor to effect rapid rotation of said positioners and thus cause the fruit engaged by their rectangular shaped upper ends to turn and move until their stem indents encounter, and are engaged by, the said rectangular-shaped ends of said positioner tenons, and means at a subsequent point of said horizontal run of said first conveyor to raise its travel and return it to its original level and thus lift the chucks with the positional fruit with the stem-blossom axis disposed vertically and the stem indent facing downwardly and to disengage the positioner tenons of said second conveyor from the cups and fruit of said first conveyor during the angular ascent.

2. The arrangement according to claim 1 wherein the outer bottom surface of said cups is of concave formation to cooperate with and facilitate the entrance and penetration of said positioner tenons into the central apertures of said cups during the angular lowering of the travel of said first conveyor, and to cooperate with and facilitate the disengagement thereof during the angular raising of the travel of said first conveyor at the end of the positioning travel.

References Cited in the file of this patent

UNITED STATES PATENTS

| | | |
|---|---|---|
| 2,296,490 | Ashlock | Sept. 22, 1942 |
| 2,406,311 | Ashlock | Aug. 27, 1946 |
| 2,528,293 | Ashlock | Oct. 31, 1950 |
| 2,558,205 | Ashlock | June 26, 1951 |
| 2,742,137 | Carroll | Apr. 17, 1956 |